United States Patent
Yamada et al.

(10) Patent No.: US 9,436,778 B2
(45) Date of Patent: Sep. 6, 2016

(54) SERVER APPARATUS, INFORMATION PROCESSING METHOD, AND INFORMATION PROCESSING SYSTEM

(75) Inventors: Kazuko Yamada, Tokyo (JP); Itaru Kawakami, Kanagawa (JP); Mitsuru Takehara, Tokyo (JP); Kazuhiro Shitama, Saitama (JP)

(73) Assignee: SONY CORPORATION, Tokyo (JP)

( * ) Notice: Subject to any disclaimer, the term of this patent is extended or adjusted under 35 U.S.C. 154(b) by 446 days.

(21) Appl. No.: 13/142,200

(22) PCT Filed: Oct. 30, 2009

(86) PCT No.: PCT/JP2009/068680
§ 371 (c)(1),
(2), (4) Date: Jun. 24, 2011

(87) PCT Pub. No.: WO2010/079649
PCT Pub. Date: Jul. 15, 2010

(65) Prior Publication Data
US 2011/0316817 A1  Dec. 29, 2011

(30) Foreign Application Priority Data
Jan. 6, 2009 (JP) .................................. 2009-001156

(51) Int. Cl.
*G06F 3/038* (2013.01)
*G06F 17/30* (2006.01)
*H04N 1/333* (2006.01)

(52) U.S. Cl.
CPC .... *G06F 17/30905* (2013.01); *H04N 1/33376* (2013.01)

(58) Field of Classification Search
CPC ............................................... G06F 17/30905
USPC .................. 345/1.1–3.3, 698, 204; 709/217; 715/838, 800, 238
See application file for complete search history.

(56) References Cited

U.S. PATENT DOCUMENTS

| 7,315,386 B1 * | 1/2008 | Shiimori et al. ............. 358/1.15 |
| 7,839,412 B2 * | 11/2010 | Sanno ............................ 345/581 |

(Continued)

FOREIGN PATENT DOCUMENTS

| JP | 09-128189 | 5/1997 |
| JP | 2004-151917 | 5/2004 |

(Continued)

OTHER PUBLICATIONS

Machine translation of Japanese Publication No. 2007167209 by Kogo Junichi on Dec. 20, 2005.*

(Continued)

*Primary Examiner* — Jason Olson
(74) *Attorney, Agent, or Firm* — Chip Law Group

(57) ABSTRACT

Provided is a server apparatus including a storing unit that stores a correspondence between terminal information of one or more information processing terminals connected via a network and one or more pieces of display control information associated with display screens of the information processing terminals; an adding unit that adds a new correspondence between the terminal information of the information processing terminal and the display control information to the storing unit in response to a user operation of at least one information processing terminal; an image data generating unit that generates image data to be displayed on the display screen of the information processing terminal based on the correspondence stored in the storing unit when an access from at least one information processing terminal is made; and a transmitting unit that transmits the image data generated by the image generating unit to the information processing terminal that has made the access.

13 Claims, 12 Drawing Sheets

(56) References Cited

U.S. PATENT DOCUMENTS

| | | | |
|---|---|---|---|
| 2002/0062396 A1* | 5/2002 | Kakei | G06F 17/30905 709/246 |
| 2003/0048281 A1* | 3/2003 | Murai et al. | 345/620 |
| 2004/0088656 A1 | 5/2004 | Washio | |
| 2004/0184078 A1* | 9/2004 | Endo et al. | 358/1.15 |
| 2004/0207654 A1* | 10/2004 | Hasuike | 345/698 |
| 2004/0236831 A1* | 11/2004 | Ohto et al. | 709/204 |
| 2005/0180643 A1* | 8/2005 | Okada | 382/232 |
| 2009/0172780 A1* | 7/2009 | Sukeda | H04N 7/17318 726/3 |

FOREIGN PATENT DOCUMENTS

| | | |
|---|---|---|
| JP | 2005-339523 | 12/2005 |
| JP | 2007-167209 | 7/2007 |

OTHER PUBLICATIONS

International Search Report from the Japanese Patent Office for International Application No. PCT/JP2009/068680 (Mail date Jan. 12, 2010).

\* cited by examiner

| No. | TERMINAL INFORMATION | | MODEL NAME |
|---|---|---|---|
| | USER AGENT | | |
| 1 | Mogila/5.0 (ePhone; U; CPU like Mac OS X; en) XppleWebKit/420+(KHTML, like Gecko) Version/3.0 Mobile/1A543a Safali/419.3 | | ePhone |
| 2 | Mogila/3.0 (DIPOCKET; JRC/AX-J301V, AX-J3 02V/1.0/1.0/c50) CNF/2.0 | | WILLCON |
| 3 | KDDJ-SN3E UP.Browser/6.1.0.7.4.127 (GUI) MMP/2.0 | | W62S |
| 4 | Mogila/3.0 (DIPOCKET; JRC/AX-J301V, AX-J3 02V/2.0/2.0/c50) CNF/2.0 | | WILLCON |
| ⋮ | ⋮ | | ⋮ |

1061 — No.
1063 — USER AGENT
1062 — TERMINAL INFORMATION
1064 — MODEL NAME

FIG.4

| No. | DISPLAY TEMPLATE NAME | DISPLAY CONTROL INFORMATION | | | |
|---|---|---|---|---|---|
| | | IMAGE SIZE | | NUMBER OF IMAGES | |
| | | VERTICAL | HORIZONTAL | VERTICAL | HORIZONTAL |
| 1 | sQCIF (128×160) | 27 | 36 | 4 | 3 |
| 2 | QCIF (176×220) | 30 | 40 | 4 | 4 |
| 3 | QVGA (240×320) | 33 | 44 | 5 | 5 |
| 4 | HVGA (320×480) | 45 | 60 | 6 | 5 |
| 5 | VGA (480×640) | 57 | 76 | 6 | 6 |
| ⋮ | ⋮ | ⋮ | ⋮ | ⋮ | ⋮ |

FIG.5

| TERMINAL No. | TEMPLATE No. |
|:---:|:---:|
| 1 | 4 |
| 2 | 1 |
| 3 | 2 |
| 1 | 3 |
| 1 | 4 |
| ⋮ | ⋮ |

FIG.6

| TERMINAL INFORMATION | | DISPLAY CONTROL INFORMATION | | | | | FREQUENCY |
|---|---|---|---|---|---|---|---|
| | | | IMAGE SIZE | | NUMBER OF IMAGES | | |
| USER AGENT | MODEL NAME | DISPLAY TEMPLATE NAME | VERTICAL | HORIZONTAL | VERTICAL | HORIZONTAL | |
| Mogila/5.0 (ePhone; U; CPU like Mac OS X; en) XppleWebKit/420+(KHTML, like Gecko) Version/3.0 Mobile/1A543a Safali/419.3 | ePhone | HVGA (480×640) | 45 | 60 | 6 | 5 | 10 |
| Mogila/4.0 (ePhone; U; CPU like Mac OS X; en) XppleWebKit/420+(KHTML, like Gecko) Version/2.0 Mobile/1A543a Safali/419.3 | ePhone | QVGA (240×320) | 33 | 44 | 5 | 5 | 3 |
| Mogila/3.0 (DIPOCKET; JRC/AX-J301V, AX-J3 02V/1.0/1.0/c50) CNF/2.0 | WILLCON | sQCIF (128×160) | 27 | 36 | 4 | 3 | 4 |
| KDDJ-SN3E UP.Browser/6.1.0.7.4.127 (GUI) MMP/2.0 | W62S | QCIF (176×220) | 30 | 40 | 4 | 4 | 4 |
| ... | ... | ... | ... | ... | ... | ... | ... |

3001 — TERMINAL INFORMATION
3002 — DISPLAY CONTROL INFORMATION
3003 — FREQUENCY

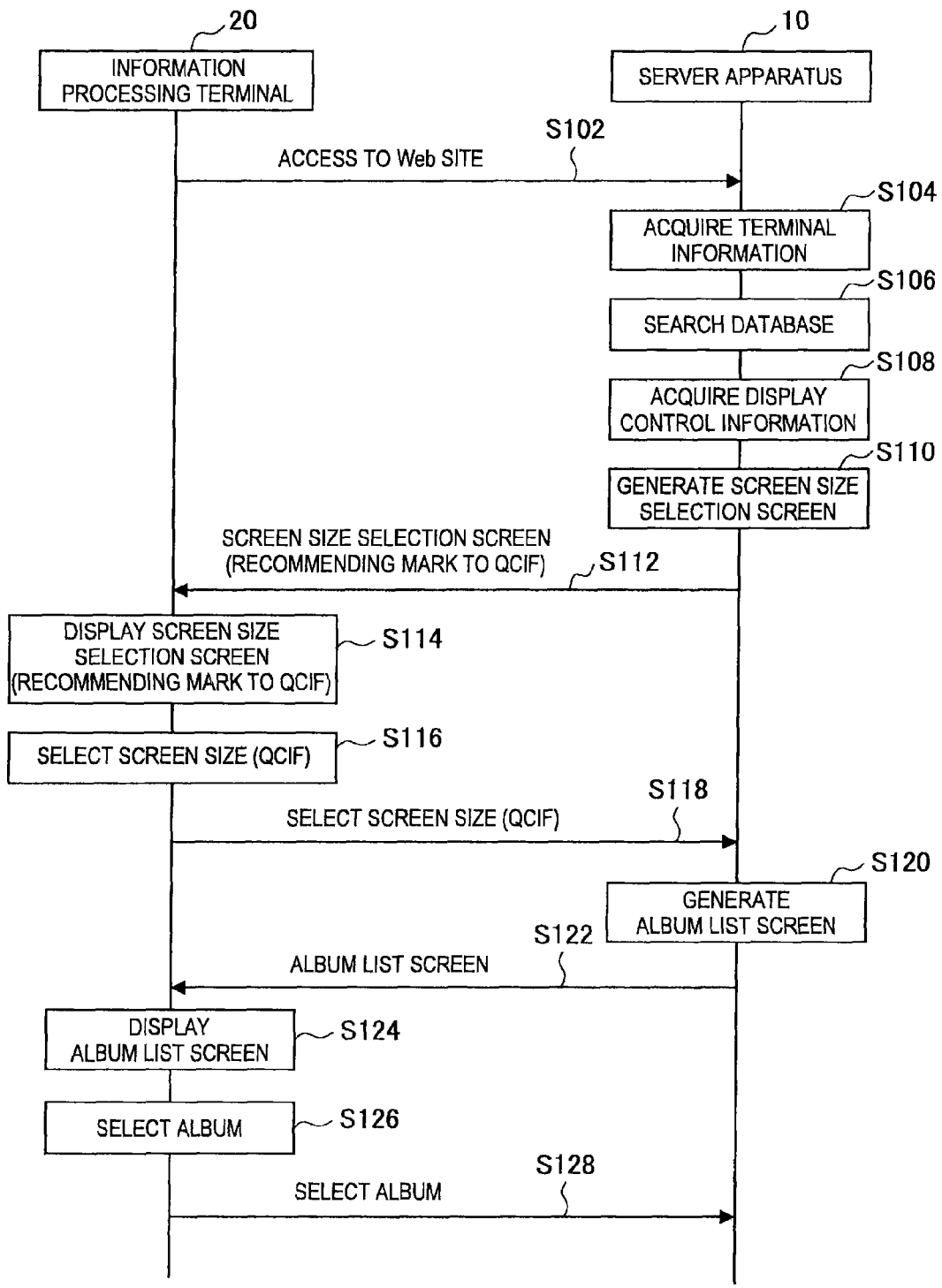

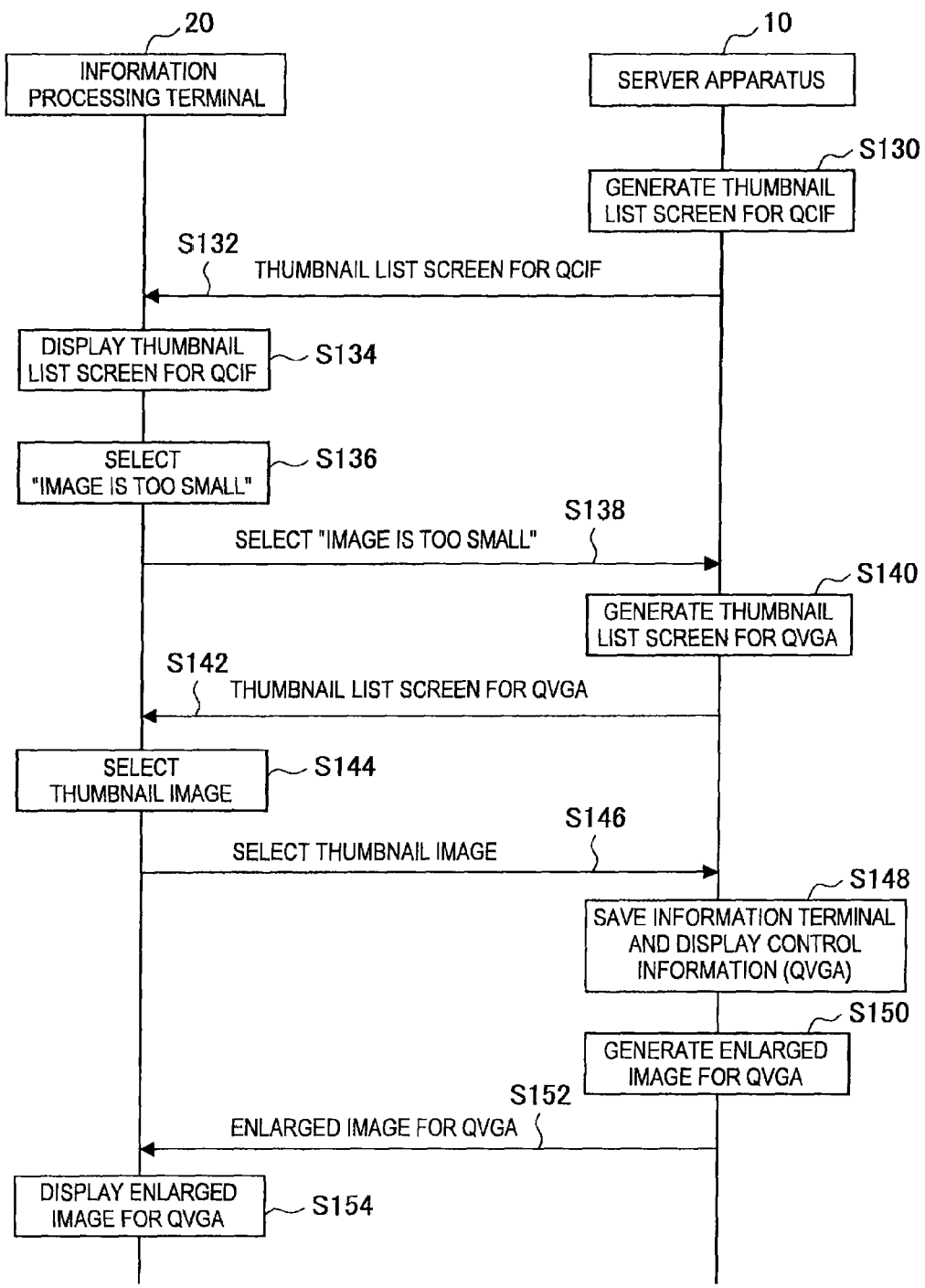

SERVER APPARATUS, INFORMATION PROCESSING METHOD, AND INFORMATION PROCESSING SYSTEM

TECHNICAL FIELD

The present invention relates to a server apparatus, an information processing method, and an information processing system, and in particular, to a server apparatus, an information processing method, and an information processing system for transmitting image data in response to a request from an information processing terminal.

BACKGROUND ART

Currently, a portable telephone is typically provided with a display device. A user possessing a portable telephone accesses the Internet using the portable telephone to view images and the like on the Internet with the display device of the portable telephone. An image of a size suited for a screen size of each portable telephone is desirably displayed on the display device of the portable telephone.

The function of the portable telephone is becoming higher in recent years, and the screen size at the display device of the portable telephone is becoming diversified accordingly. Furthermore, an enormous number of types of models exist since new model portable telephones are being released one after the other. Therefore, the image of a size most suited for the screen size of each model needs to be displayed. A method in which the screen size information of each portable telephone is held on the Web server side, and the image is resized by the Web server according to the terminal of each portable telephone for display is considered (e.g., Patent Literature 1).

In such a method, however, the trouble of maintenance and cost are great since an enormous amount of screen size information associated with the model of each portable telephone is to be managed, and such screen size information is to be updated every time a new model is launched. Therefore, a method of classifying display control information such as screen size and resolution of the portable telephone into a few groups in advance, and determining the screen size and the number of images most suited for the respective screen size is considered. The user then can display a list of classified screen sizes on the display screen of the portable telephone every time the user accesses the Web server using the portable telephone, so that the user can select the optimum one.

CITATION LIST

Patent Literature

Patent Literature 1: JP 2002-244971

SUMMARY OF INVENTION

Technical Problem

However, since most users possessing the portable telephone do not know the screen size of the terminal being used, the user may not know which size to select. Furthermore, it is difficult for the provider providing the image data to the information processing terminal such as the portable telephone via the Web server to provide the image data using the display control information such as the desired image size to the user of each information processing terminal.

In light of the foregoing, it is desirable to provide a novel and improved server apparatus, information processing method, and information processing system capable of displaying images using the display control information desired by the user of each information processing terminal.

Solution to Problem

According to the first aspect of the present invention in order to achieve the above-mentioned object, there is provided a server apparatus including: a storing unit that stores a correspondence between terminal information of one or more information processing terminals connected via a network and one or more pieces of display control information associated with display screens of the information processing terminals; an adding unit that adds a new correspondence between the terminal information of the information processing terminal and the display control information to the storing unit in response to a user operation of at least one information processing terminal; an image data generating unit that generates image data to be displayed on the display screen of the information processing terminal based on the correspondence stored in the storing unit when an access from at least one information processing terminal is made; and a transmitting unit that transmits the image data generated by the image generating unit to the information processing terminal that has made the access.

According to such configuration, a new correspondence between the terminal information of the information processing terminal and the display control information is added to the storing unit in response to the user operation. The server apparatus generates the image data using the display control information corresponding to the terminal information of the information processing terminal that has made the access. The display control information desired by the user of the information processing terminal then can be added to the storing unit. Furthermore, the image can be displayed using the display control information desired by the user of each information processing terminal as the image data is generated using the display control information. Moreover, the display control information such as the optimum screen size can be recommended to the information processing terminal that has made the access.

The storing unit may store a list of the display control information, and the adding unit may add new display control information to the list of the display control information stored in the storing unit in response to the user operation of the information processing terminal.

The adding unit may select the display control information from the list of the display control information in response to the user operation of the information processing terminal, and add a correspondence between the information processing terminal and the selected display control information to the storing unit.

The display control information may include at least the resolution information and the display number information of the thumbnails displayed in a list on the display screen of the information processing terminal.

The image data generating unit may generate the image data using the display control information corresponding to the terminal information of the information processing device of the correspondences stored in the storing unit at the display screen of the information processing device that has made the access.

The image data generating unit may generate image data including a display of a list of the display control information stored in the storing unit, and generate image data in which the display control information corresponding to the terminal information of the information processing device of the display control information displayed in a list on the display screen is displayed distinguished from other display control information when an access is made from the information processing device.

The image data generating unit may generate image data for displaying a predetermined image using a display format based on the display control information corresponding to the terminal information of the information processing device on the display screen of the information processing terminal that has made the access.

The server apparatus may further include a counting unit that counts the number of times specific display control information is selected from the list of the display control information in response to the user operation of the information processing terminal, and the image data generating unit may generate image data preferentially using display control information corresponding to the terminal information of the information processing device for which the number of times counted by the counting unit is large on the display screen of the information processing device that has made the access. Furthermore, the server apparatus may be connected to a plurality of other server apparatuses via the network, and the display control information may be mutually transmitted and received for sharing among the connected plurality of other server apparatuses.

According to the second aspect of the present invention in order to achieve the above-mentioned object, there is provided an information processing method including: adding a new correspondence between terminal information of an information processing terminal and display control information to a storing unit that stores a correspondence between the terminal information of the information processing terminal and one or more pieces of display control information associated with display screens of the information processing terminals in response to a user operation of one or more information processing terminals connected via a network; generating image data to be displayed on the display screen of the information processing terminal based on the correspondence stored in the storing unit when an access from at least one information processing terminal is made; and transmitting the generated image data to the information processing terminal that has made the access.

According to the third aspect of the present invention in order to achieve the above-mentioned object, there is provided an information processing system in which a server apparatus and an information processing terminal are connected via a network. The server apparatus includes a storing unit that stores a correspondence between terminal information of an information processing terminal connected via a network and one or more pieces of display control information associated with display screens of the information processing terminals, an adding unit that adds a new correspondence between the terminal information of the information processing terminal and the display control information to the storing unit in response to a user operation of the information processing terminal, an image data generating unit that generates image data to be displayed on the display screen of the information processing terminal based on the correspondence stored in the storing unit when an access from the information processing terminal is made, and a transmitting unit that transmits the image data generated by the image generating unit to the information processing terminal.

The information processing terminal includes an entering unit that enters display control information suited to the information processing terminal in response to the user operation, a transmitting unit that transmits the display control information entered by the entering unit to the server apparatus, and a displaying unit that displays the image data transmitted by the server apparatus on the display screen.

Advantageous Effects of Invention

According to the present invention, the image can be displayed using the display control information desired by the user of each information processing terminal.

BRIEF DESCRIPTION OF DRAWINGS

FIG. 3 is an explanatory view describing a content of a list of terminal information according to the embodiment.

FIG. 4 is an explanatory view describing the content of a list of display control information according to the embodiment.

FIG. 5 is an explanatory view describing the content of the correspondence between the terminal information and the display control information according to the embodiment.

FIG. 6 is an explanatory view describing the content of the display control information counted for every terminal information of the information processing terminal according to the embodiment.

FIG. 7 is a timing chart describing the information processing method for the case in which the information processing terminal known in the server apparatus makes an access according to the embodiment.

FIG. 8 is a timing chart describing the information processing method for the case in which the information processing terminal known in the server apparatus makes an access according to the embodiment.

Figure 1:
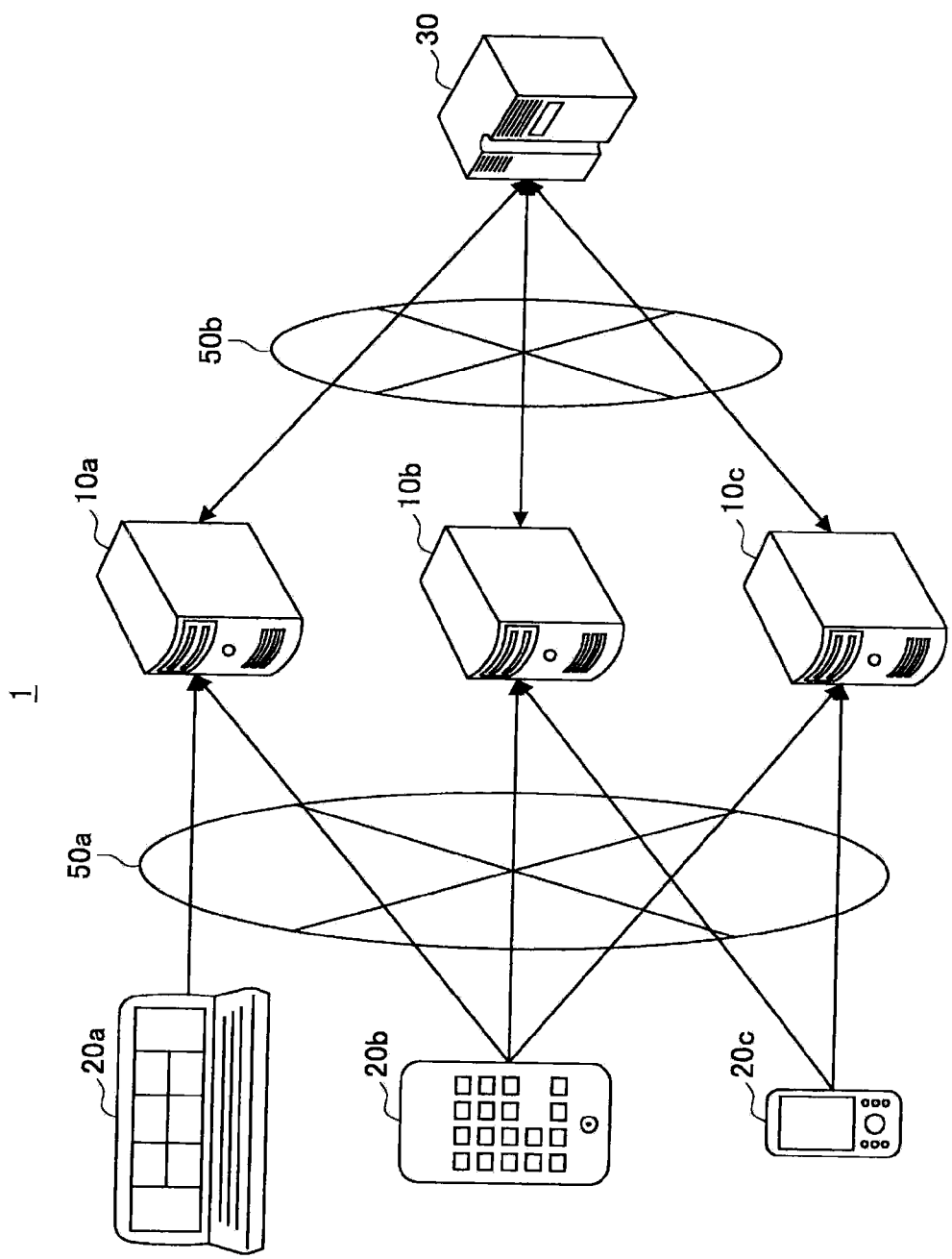
FIG. 1 is an explanatory view describing an outline of an information processing system according to one embodiment of the present invention.

REFERENCE SIGNS LIST 10, 10a, 10b, 10c, 30 server apparatus
102 receiving unit
104 adding unit
105 storing unit
110 image data generating unit
112 transmitting unit
20, 20a, 20b, 20c information processing terminal
202 entering unit
204 transmitting unit 206 displaying unit
208 receiving unit

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The "Description of Embodiments" will be described in the following order.
[1] Object of present embodiment
[2] Outline of information processing system
[3] Function configuration of server apparatus and information processing terminal
[4] Details of information processing method in information processing system

[1] Object of Present Embodiment

First, the object of the present embodiment will be described. Currently, a portable telephone is typically provided with a display device. A user possessing a portable telephone accesses the Internet using the portable telephone to view images and the like on the Internet on the display device of the portable telephone. An image of a size suited for a screen size of each portable telephone is desirably displayed on the display device of the portable telephone.

The function of the portable telephone is becoming higher in recent years, and the screen size at the display device of the portable telephone is becoming diversified accordingly. Furthermore, new model portable telephones are being released one after the other, and the type of model exists in enormous number. Therefore, the image of a size most suited for the screen size of each model needs to be displayed. A method in which the screen size information of each portable telephone is held on the Web server side, and the image is resized by the Web server according to the terminal of each portable telephone for display is considered.

In such a method, however, an enormous amount of screen size information associated with the model of each portable telephone is to be managed, and such screen size information is to be updated every time a new model is launched, and hence the trouble of maintenance and cost are great. Therefore, a method of classifying display control information such as screen size and resolution of the portable telephone into a few groups in advance, and determining the screen size and the number of images most suited for each screen size is considered. The user then can display a list of classified screen sizes on the display screen of the portable telephone every time the user accesses the Web server using the portable telephone, so that the user can select the optimum one.

However, since most users possessing the portable telephone do not know the screen size of the terminal being used, the user may not know which size to select. Furthermore, it is difficult for the provider providing the image data to the information processing terminal such as the portable telephone through the Web server to provide image data using the display control information such as the desired image size to the user of each information processing terminal. An information processing system 1 according to an embodiment of the present invention has been contrived in view of such situation. According to the information processing system 1 of the present embodiment, the image can be displayed using the display control information desired by the user of each information processing terminal.

[2] Outline of Information Processing System

The outline of the information processing system 1 according to the present embodiment will now be described based on FIG. 1. FIG. 1 is an explanatory view describing an outline of the information processing system 1 according to the present embodiment. As shown in FIG. 1, the information processing system 1 is configured to include server apparatuses 10a, 10b, 10c (hereinafter also collectively referred to as server apparatus 10), information processing terminals 20a, 20b, 20c (hereinafter also collectively referred to as information processing terminal 20), a server apparatus 30, and the like.

The information processing terminal 20 is an information processing terminal including a display device such as a portable telephone, a PDA (Personal Digital Assistant), a small PC (Personal Computer), and the like. The information processing terminal 20 connects to the server apparatus 10 via a network 50a to request and receive various types of data in the service provided by the server apparatus 10. In the present embodiment, the information processing terminal 20 mainly has a function of accessing the server apparatus 10, receiving the image data on the Internet and displaying the same on the display screen. A function of transmitting the display control information such as the screen size selected by the user of the information processing terminal 20 to the server apparatus 10 as display control information suited for the information processing terminal 20 is also provided.

The server apparatus 10 has a function of distributing various types of information via the network, and can be exemplified by a Web server or the like. The server apparatus 10 also has a function of connecting to the information processing terminal 20, to be described later, via the network 50a, and transmitting the requested various types of data with respect to the information processing terminal 20 that has made the access. In the present embodiment, the server apparatus 10 stores the display control information such as the screen size selected by the user of the information processing terminal 20 as display control information suited for the information processing terminal 20. Specifically, a correspondence between the terminal information such as the model name of the information processing terminal 20 and the display control information such as the screen size selected by the user of the information processing terminal 20 are stored. When an access is made from the information processing terminal 20a, the image data most suited for display on the display screen of the information processing terminal 20a is transmitted to the information processing terminal 20a based on the stored correspondence between the terminal information and the display control information.

As shown in FIG. 1, a plurality of server apparatuses 10 may exist on the Internet (server apparatuses 10a, 10b, 10c). In this case, the server apparatus 30 has a function of connecting to the server apparatuses 10a, 10b, 10c via a network 50b, and collecting the correspondence between the terminal information and the display control information stored in the server apparatuses 10a, 10b, 10c. The server apparatus 30 may carry out classification, counting, and the like of the collected information, and feed back the result of counting or the like to the server apparatuses 10a, 10b, 10c. A plurality of server apparatuses 10 then can share the display control information suited to each of a great number of information processing terminals 20 with each other.

The networks 50a and 50b are communication line networks for connecting the information processing terminal 20, the server apparatus 10, and the server apparatus 30 so as to be bi-directionally communicable. The networks 50a and 50b are configured by a public line network such as Internet, telephone line network, and satellite communication network, a dedicated line network such as a WAN, LAN, IP-VPN, or the like, and may be wired or wireless.

As described above, according to the information processing system 1, the display control information such as the screen size selected by the user of the information processing terminal 20 can be stored on the server apparatus side as the display control information suited for the information processing terminal 20. An image suited to the screen size and the like of the display screen of each information processing terminal 20 thus can be displayed at higher accuracy with respect to many types of information processing terminals 20.

[3] Function Configuration of Server Apparatus and Information Processing Terminal The outline of the information processing system 1 has been described above. The function configuration of the server apparatus 10 and the information processing terminal 20 will now be described with reference to FIG. 2. FIGS. 3 to 6 will be appropriately referenced in describing the function configuration of the server apparatus 10 and the information processing terminal 20.

Figure 2:
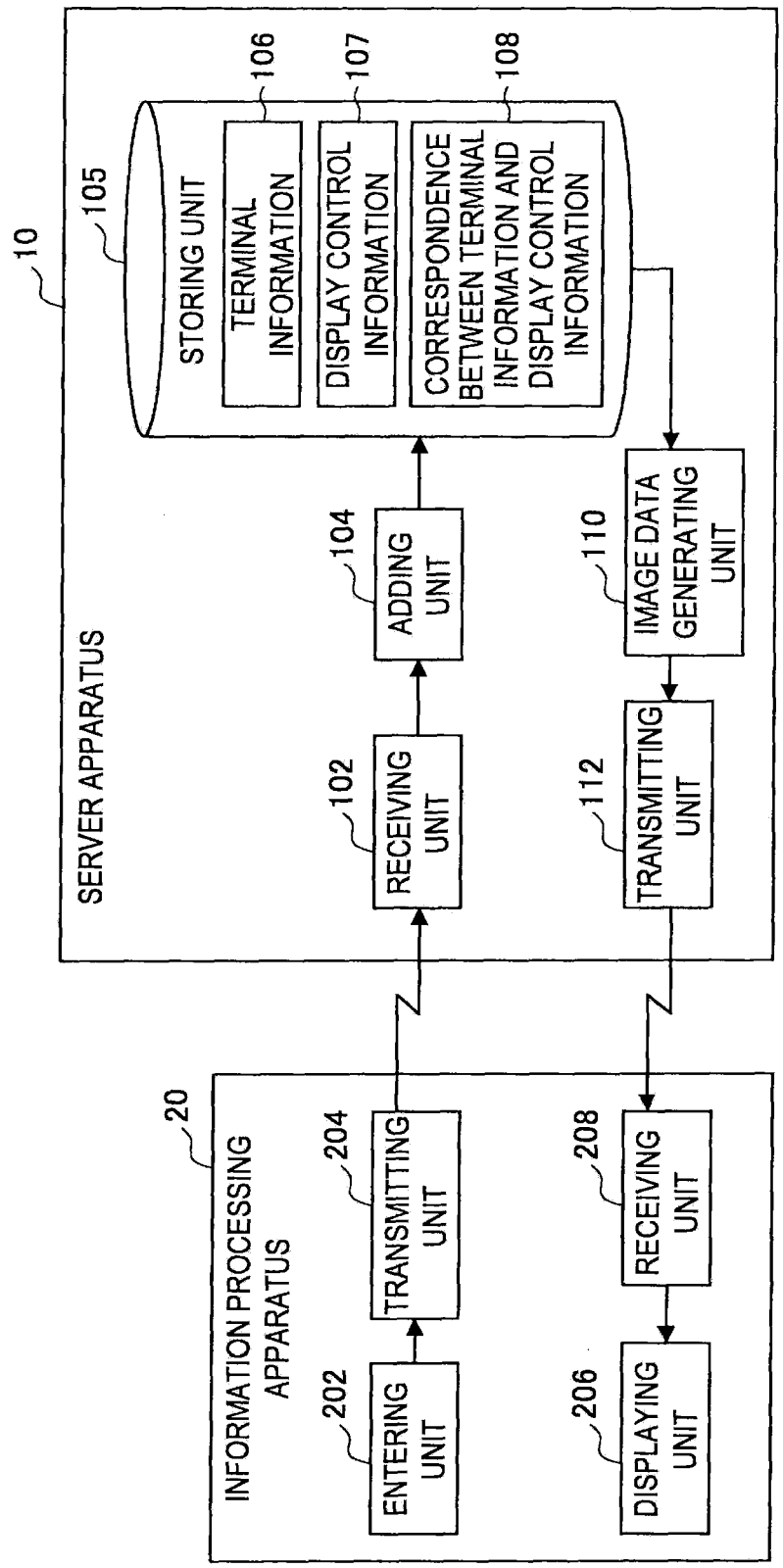
FIG. 2 is a block diagram showing a function configuration of a server apparatus and an information processing terminal according to the embodiment.

As shown in FIG. 2, the server apparatus 10 includes a receiving unit 102, an adding unit 104, a storing unit 105, an image data generating unit 110, a transmitting unit 112, and the like. The receiving unit 102 is a communication interface configured by a communication device and the like, and has a function of receiving transmission data from the information processing terminal 20. Specifically, the receiving unit 102 has a function of receiving the terminal information of the information processing terminal 20 that has made the access and the display control information selected by the user of the information processing terminal 20, and providing the same to the adding unit 104.

The adding unit 104 has a function of adding a new correspondence between the terminal information of the information processing terminal 20 and the display control information to the storing unit 105 in response to the user operation of the information processing terminal 20. As described above, the adding unit 104 associates the terminal information of the information processing terminal 20 provided from the receiving unit 102 with the display control information selected by the user of the information processing terminal 20, and stores the same in the storing unit 105. The display control information, and the correspondence between the terminal information and the display control information stored in the storing unit 105 will be described in detail later.

The storing unit 105 may be a storage medium such as a non-volatile memory including an EEPROM (Electrically Erasable Programmable Read-Only Memory) and an EPROM (Erasable Programmable Read Only Memory), a magnetic disc including a hard disc and a disc-shaped magnetic body disc, an optical disc such as a CD-R (Compact Disc Recordable)/RW (ReWritable), DVD-R (Digital Versatile Disc Recordable)/RW/+R/+RW/RAM (Randam Access Memory), and BD (Blu-ray Disc (registered trademark))-R/BD-RE, and an MO (Magneto Optical) disc.

The storing unit 105 stores a list 107 of display control information, and a correspondence 108 between the terminal information 106 and the display control information 107. The terminal information 106 will be described with reference to FIG. 3. FIG. 3 is an explanatory view describing the content of a list of terminal information 106. As shown in FIG. 3, the list of terminal information 106 includes a number (No.) 1061, and a user agent 1063 and a model name 1064 corresponding to the number 1061. Different user agents 1063 may be set for the same model name 1064. For instance, even if the model is the same, the value of the user agent differs for the normal state (vertical display) and for when inverted 90 degrees (horizontal display).

The display control information 107 will be described. FIG. 4 is an explanatory view describing the content of the list of display control information 107. As shown in FIG. 4, the list of display control information 107 includes a number (No.) 1071 and display control information 1072 corresponding to the number 1071. The display control information 1072 includes display template name 1073, vertical and horizontal image sizes 1074 of a thumbnail, number of images (number of images vertically and horizontally) 1075, and the like. The display template name 1073 may be an image resolution that represents a screen size, or may be information that represents size such as S, M, and L. If the image resolution is used for the display template name, it is represented with a predetermined resolution such as QVGA and HVGA. The image size 1074 of the thumbnail represents the vertical and horizontal size of the image itself. The number of images 1075 represents the number of thumbnails that can be displayed when displaying a plurality of thumbnails on the display screen of the information processing terminal 20.

The list of display control information 107 may be stored in the storing unit 105 in advance, or may be added by the adding unit 104 in response to the user operation of the information processing terminal 20. In addition to the display control information stored in the storing unit 105 in advance, new display control information may be added to the list of display control information 107 in response to the user operation of the information processing terminal 20 by the adding unit 104. Furthermore, the display control information 1072 may have parameter information related to the display control other than the display template name 1073, the image size 1074, and the number of images 1075 added by the adding unit 104.

Figure 5:
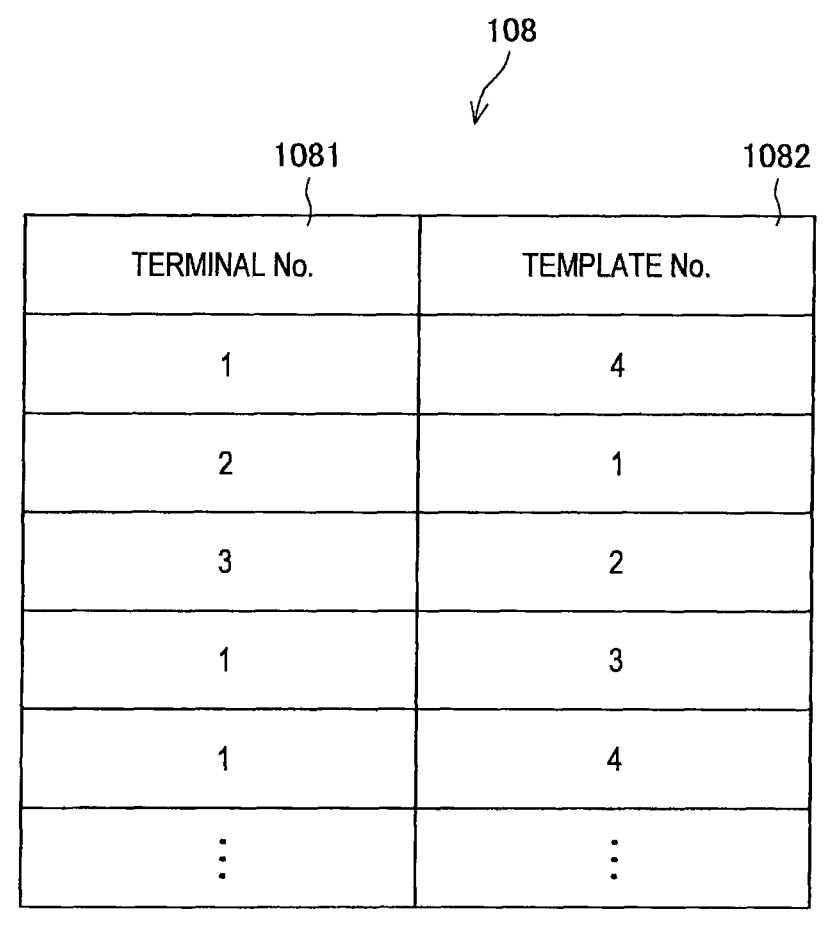

The correspondence 108 between the terminal information and the display control information will now be described with reference to FIG. 5. FIG. 5 is an explanatory view describing the content of the correspondence 108 between the terminal information and the display control information (hereinafter also referred to as correspondence 108). As shown in FIG. 5, the correspondence 108 has a model number (No.) 1081 or the terminal information of the information processing terminal 20 and a template number (No.) 1082 stored in correspondence to each other. The model number (No.) 1081 is the number 1061 of the list of terminal information 106 described above. The template number is the number 1071 of the list of display control information 107 described above.

The model number (No.) 1081 of the terminal information of the information processing terminal 20 in which the access from the information processing terminal 20 is made, and the template number 1082 in the list of display control information selected in response to the user operation of the information processing terminal 20 are sequentially stored in correspondence to each other in the correspondence 108 by the adding unit 104. For instance, if an access is made to the server apparatus 10 from the information processing terminal 20 whose model number (No.) 1081 is "1" and "4" of the template number 1082 is selected by the user of the information processing terminal 20, "ePhone" and "4" are stored in correspondence to each other in the correspondence 108. The selection of the template by the user operation of the information processing terminal 20 will be described in detail later.

The terminal information and the template number of the information processing terminal 20 stored in the correspondence 108 may be classified and counted for every terminal information of the information processing terminal 20. In this case, a counting unit (not shown) for counting the template number for every terminal information may be arranged in the server apparatus. Furthermore, as shown in FIG. 1, if one server apparatus 30 is connected to a plurality of server apparatuses 10 via the network, the correspondence between the terminal information and the display control information may be collected by the server apparatus 30, and the collected information may be classified, counted, or the like.

Consider a case where the template number of the display control information stored in each server apparatus 10 is a uniquely numbered number in the storage device of each server apparatus 10. In this case, each server apparatus 10 may transmit the correspondence of the terminal information (user agent, model name) of the information processing terminal 20 and the display control information (display template name, vertical and horizontal image size, number of images vertically and horizontally, etc.) to the server apparatus 30.

The display control information counted for every terminal information of the information processing terminal 20 in the server apparatus 30 will be described with reference to FIG. 6. FIG. 6 is an explanatory view describing the content of the display control information counted for every terminal information of the information processing terminal 20. As shown in FIG. 6, the information counted in the server apparatus 30 includes terminal information 3001 (user agent, model name), display control information 3002 (display template name, vertical and horizontal image size, number of images vertically and horizontally, etc.), frequency 3003, and the like.

The terminal information 3001 includes the user agent, the model name, and the like. The display control information 3002 includes the display template name, the vertical and horizontal image size, the number of images vertically and horizontally, and the like. The frequency 3003 is the number of times each display control information 3002 is selected by the user for every terminal information 3001.

For instance, the user of the information processing terminal 20 having the model name "ePhone" has selected the display control information 3002 in which the screen size is "HVGA (480×640)", the vertical number of images is "6", and the horizontal number of images is "5" ten times. The user of the information processing terminal 20 having the model name "ePhone" has selected the display control information 3002 in which the screen size is "QVGA (240×320)", the vertical number of images is "5", and the horizontal number of images s "5" three times. Thus, in the information processing terminal 20 having the model name "ePhone", it is apparent that the display control information 3002 in which the screen size is "HVGA (480×640)", the vertical number of images is "6", and the horizontal number of images is "5" is the display control information most suited for display on the display screen.

The display control information counted for every terminal information of the information processing terminal 20 may be counted in each server apparatus 10, and the counted result may be transmitted to the server apparatus 30.

Returning back to FIG. 2, the function configuration of the server apparatus 10 will be described. The image data generating unit 110 has a function of generating image data to display on the display screen of the information processing terminal 20 based on the correspondence 108 between the terminal information of the information processing terminal 20 and the display control information stored in the storing unit 105 when an access from the information processing terminal 20 is made.

When the image data generating unit 110 generates the image data based on the correspondence 108, this means that the image data is generated using the display control information corresponding to the terminal information of the information processing terminal 20 that has made the access. Specifically, the image data for which transmission request is made from the information processing terminal 20 is formed to an image size contained in the display control information 107. When displaying a plurality of thumbnails, a display screen in which the plurality of thumbnails becomes the vertical number of images 1074 and the horizontal number of images 1075 contained in the display control information 107 is generated.

The image data generating unit 110 may generate image data including the list of display control information 107 stored in the storing unit 105, and provide the image data to the transmitting unit 112. When an access is made from the information processing terminal 20, image data in which the display control information corresponding to the terminal information of the information processing device of the display control information displayed in a list on the display screen is displayed so as to be distinguished from other display control information may be generated.

The display of being distinguished from other display control information includes displaying one or more display control information of the display control information displayed in a list with a different color so as to stand out. A predetermined mark may be given to the one or more display control information. Therefore, a display for recommending specific display control information to the user of the information processing terminal 20 may be realized by displaying the one or more display control information of the display control information displayed in a list so as to be distinguished by the user. Such recommending display is hereinafter also referred to as "recommending mark".

The transmitting unit 112 is a communication interface configured by a communication device and the like, and has a function of transmitting the image data provided from the image data generating unit 110 to the information processing terminal 20 that has made the access.

The function configuration of the server apparatus 10 has been described above. The function configuration of the information processing terminal 20 will now be described. As shown in FIG. 2, the information processing terminal 20 includes an entering unit 202, a transmitting unit 204, a displaying unit 206, a receiving unit 208, and the like.

The entering unit 202 includes an entering means for the user to enter information such as a ten key, a touch panel, a button, a microphone, a switch, or a lever, and has a function of entering the display control information suited to the information processing terminal 20 in response to the user operation. The display control information entered by the entering unit 202 is provided to the transmitting unit 204. The display control information entered by the user operation may be entered by being selected from the list of display control information displayed on the display screen.

As described above, the list of display control information is transmitted from the server apparatus 10, and the recommending mark is given to the one or more display control information of the display control information displayed in a list. Therefore, the user operating the information processing terminal 20 can enter one display control information by selecting the display control information with the recommending mark.

The transmitting unit 204 is a communication interface configured by a communication device and the like, and has a function of transmitting the display control information entered by the entering unit 202 to the server apparatus 10. The receiving unit 208 is a communication interface configured by a communication device and the like, and has a function of receiving the image data transmitted from the transmitting unit 112 of the server apparatus 10 and providing the same to the displaying unit 206.

The displaying unit 206 has a function of displaying various types of information such as image on the display screen of the liquid crystal display (LCD) device, or the like. The displaying unit 206 has a function of displaying the image data provided by the receiving unit 208 on the display screen. The image data displayed on the display screen of the information processing terminal 20 will be specifically described later.

[4] Details of Information Processing Method in Information Processing System

The function configurations of the server apparatus 10 and the information processing terminal 20 have been described above. The details of the information processing method in the information processing system 1 will be described with reference to FIGS. 7 to 12. Hereinafter, a case in which the information processing terminal 20 known in the server apparatus 10 makes an access and a case in which the information processing terminal 20 unknown in the server apparatus 10 makes an access will be described.

Figure 9:
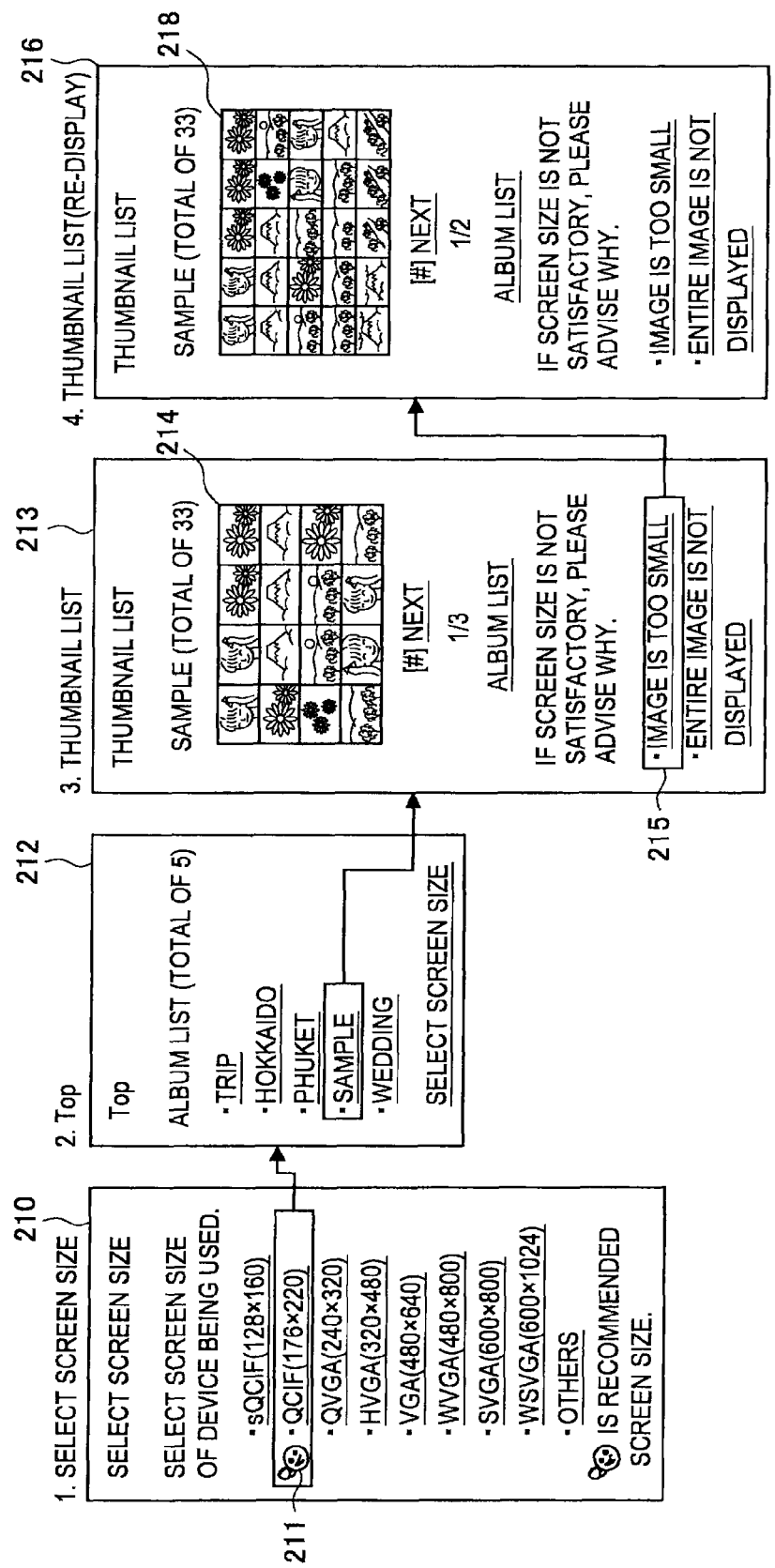
FIG. 9 is an explanatory view describing a display example of a display screen of the information processing terminal according to the embodiment.

First, the information processing method for the case in which the information processing terminal 20 known in the server apparatus 10 makes an access will be described with reference to FIGS. 7 to 9. FIGS. 7 and 8 are timing charts describing the information processing method for the case in which the information processing terminal 20 known in the server apparatus 10 makes an access. In describing such information processing method, the drawing of FIG. 9 will be appropriately referenced. FIG. 9 is an explanatory view describing a display example of the display screen of the information processing terminal 20.

As shown in FIG. 7, the information processing terminal 20 first accesses the Web site via the Internet to access the server apparatus 10 (S102). The server apparatus 10 accessed by the information processing terminal 20 in step S102 acquires terminal information of the relevant information processing terminal 20 (S104). The terminal information acquired in step S104 is the information for specifying the model of the information processing terminal 20 including the user agent, the model name, and the like of the information processing terminal 20.

The image data generating unit 110 of the server apparatus 10 then searches the database of the storing unit 105 (S106). The database searched by the server apparatus 10 in step S106 is the list of display control information 107 and the correspondence 108 between the terminal information and the display control information stored in the storing unit 105. The image data generating unit 110 searches the database including the correspondence 108 in step S106, and acquires the display control information corresponding to the terminal information acquired in step S104 (S108).

The image data generating unit 110 generates a screen size selection screen (S110). The screen size selection screen generated in step S110 includes the list of display control information 107 (display template name) stored in the storing unit 105. The screen size represented by the screen resolution is used for the display template name. In the screen size selection screen, the recommending mark is given to the screen size acquired in step S108.

The screen size selection screen generated in step S110 is transmitted to the information processing terminal 20 that has made the access in step S102 (S112). In the screen size selection screen transmitted to the information processing terminal 20 in step S112, the recommending mark is given to the QCIF, which is an example of a screen size.

The displaying unit 206 of the information processing terminal 20, to which the screen size selection screen is transmitted in step S112, displays the relevant selection screen on the display screen (S114). The screen size selection screen will now be described with reference to FIG. 9. As shown in FIG. 9, a plurality of screen sizes is displayed in a list in the screen size selection screen 210. A recommending mark 211 is given to the screen size (QCIF) acquired in step S108.

Returning back to FIG. 7, after the screen size selection screen is displayed on the display screen in step S114, the entering unit 202 of the information processing terminal 20 selects the screen size (QCIF) in response to the user operation (S116). In step S116, the user of the information processing terminal 20 recognizes that the screen size "QCIF" is the recommended screen size in the display screen of the information processing terminal 20 by the recommending mark displayed on the screen size selection screen.

The information of the screen size (QCIF) selected in step S116 is transmitted to the server apparatus 10 (S118). The image data generating unit 110 of the server apparatus 10 generates an album list screen (S120). The album list screen generated in step S120 is a list of names of the albums created in response to the user operation. The transmitting unit 112 of the server apparatus 10 transmits the album list screen generated in step S120 to the information processing terminal 20 (S122).

The displaying unit 206 of the information processing terminal 20, to which the album list screen is transmitted from the server apparatus 10 in step S122, displays the album list screen on the display screen (S124). The display screen 212 of FIG. 9 is an example of the album list screen displayed on the display screen of the information processing terminal 20 in step S124. Returning back to FIG. 7, the entering unit 202 of the information processing terminal 20 selects a specific album from the album list screen in response to the user operation after the album list screen is displayed on the display screen in step S124 (S126).

The information on the album selected in step S126 is transmitted to the server apparatus 10 (S128). The image data generating unit 110 of the server apparatus 10 to which the information of the album is transmitted in step S128 generates a thumbnail list screen for the screen size (QCIF) selected for the information processing terminal 20 in step S116 (S130). The thumbnail list screen generated in step S130 is generated using the display control information stored in the storing unit 105.

For instance, since the screen size selected in step S116 is QCIF, the template number "2" of FIG. 4 is assumed. In such a case, the image data generating unit 110 arranges a plurality of thumbnails "4" vertically and "4" horizontally, resizes the image so that the image size of one thumbnail is "30" vertically and "40" horizontally, and generates the list screen. The image data generating unit 110 generates the thumbnail list screen in which the plurality of thumbnails are displayed in step S118, but it is not limited to such an example. For instance, the display image including one of the images contained in the selected album may be generated using the image size such as 150×200 suited for the QCIF.

The transmitting unit 112 of the server apparatus 10 then transmits the thumbnail list screen for the QCIF generated in step S130 to the information processing terminal 20 (S132). The displaying unit 206 of the information processing terminal 20, to which the thumbnail list screen for the QCIF is transmitted from the server apparatus 10 in step S132, displays the thumbnail list screen on the display screen (S134). The display screen 213 of FIG. 9 is an example of the thumbnail list screen for the QCIF displayed on the display screen of the information processing terminal 20 in step S134. In the display screen 213, selectable text information 215 such as "image is too small" and "entire image is not displayed" is displayed along with the thumbnail list screen 214 including a plurality of thumbnails.

Returning back to FIG. 8, the entering unit 202 of the information processing terminal 20 selects "image is too small" in response to the user operation after the thumbnail list screen is displayed in the display screen in step S134 (S146). The selection information "image is too small" selected in step S136 is transmitted to the server apparatus (S138).

The image data generating unit 110 of the server apparatus 10, to which the selection information "image is too small" is transmitted in step S138 generates a thumbnail list screen for a screen size (QVGA) greater than the QCIF (S140). The transmitting unit 112 of the server apparatus 10 transmits the thumbnail list screen for the QVGA generated in step S140 to the information processing terminal 20 (S142).

The displaying unit 206 of the information processing terminal 20, to which the thumbnail list screen for the QVGA is transmitted from the server apparatus 10 in step S142, displays the thumbnail list on the display screen. A display screen 216 of FIG. 9 is an example of the thumbnail list screen for the QVGA displayed on the display screen of the information processing terminal 20. Returning back to FIG. 8, one thumbnail image is selected in response to the user operation from the plurality of thumbnail images displayed on the display screen in the information processing terminal 20 (S144). The selection information of the thumbnail image selected in step S144 is transmitted to the server apparatus 10 (S146).

When the selection information of the thumbnail image is transmitted by the information processing terminal 20 in step S146, the server apparatus 10 saves the terminal information of the information processing terminal 20 and the screen size (QVGA) in correspondence to each other in the storing unit 105 (S148). As the correspondence between the terminal information and the display control information is stored in the storing unit 105 in step S148, the QVGA can be recommended as an optimum screen size when the terminal of the same model as the relevant information processing terminal 20 makes an access after such correspondence is saved. The image data generating unit 110 of the server apparatus 10 then generates an enlarged image for the QVGA (S150).

The transmitting unit 112 of the server apparatus 10 transmits the enlarged image data generated in step S150 to the information processing terminal 20 (S152). The displaying unit 206 of the information processing terminal 20, to which the enlarged image for the QVGA is transmitted in step S152, displays the enlarged image for the QVGA on the display screen (S154).

The information processing method for the case in which the information processing terminal 20 known in the server apparatus 10 makes an access has been described above. The display control information suited for the information processing terminal 20 may be recommended or the image using the display control information may be displayed based on the correspondence between the terminal information and the display control information already stored in the server apparatus 10 with respect to the information processing terminal 20 known in the server apparatus 10. The user of the information processing terminal 20 can select other display control information if the recommended display control information is not satisfactory. As a result, the server apparatus 10 can recommend the display control information more suited to the information processing terminal 20 or display the image using the display control information.

Figure 10:
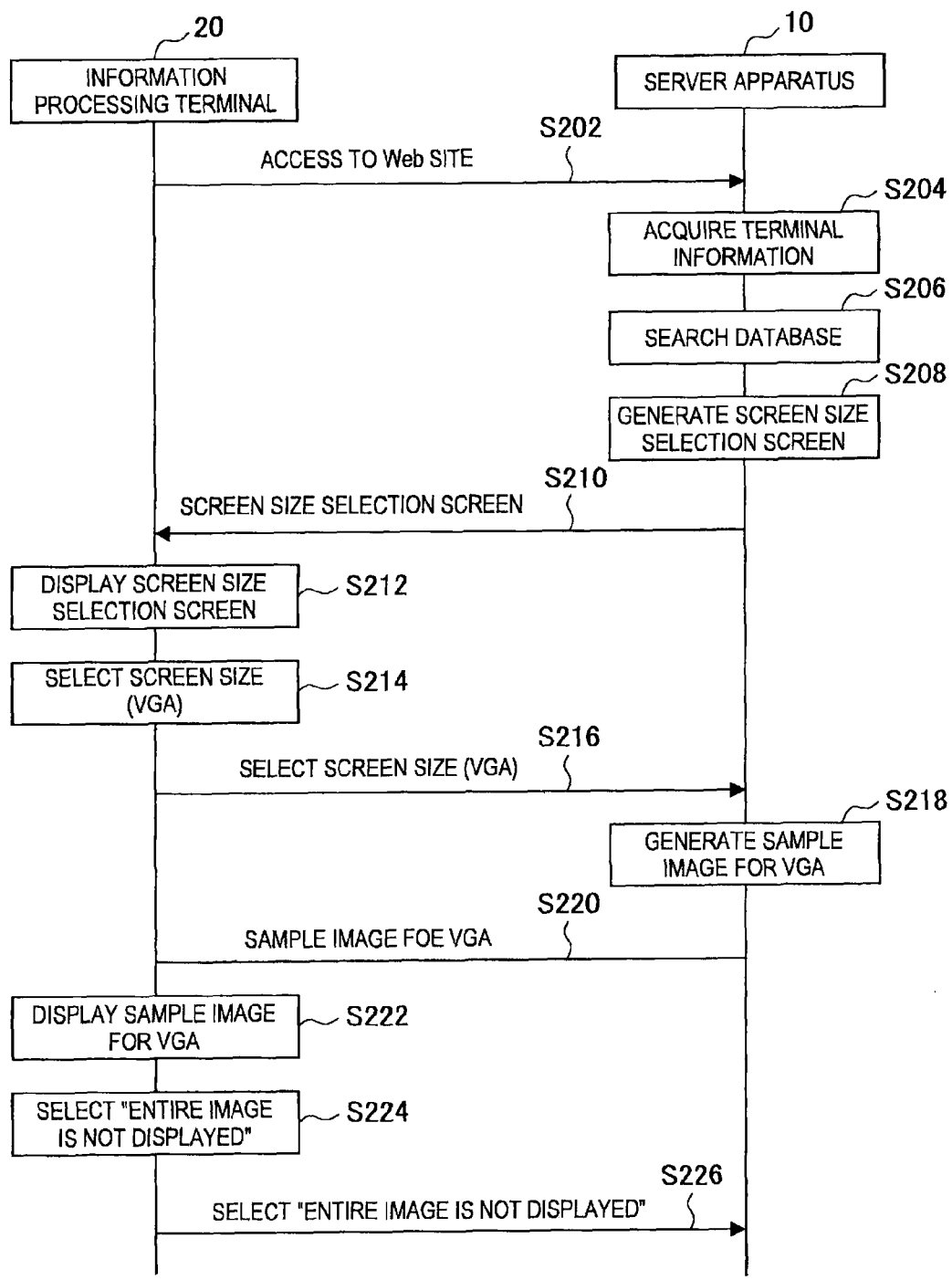
FIG. 10 is a timing chart describing the information processing method for the case in which the information processing terminal unknown in the server apparatus makes an access according to the embodiment.
Figure 11:
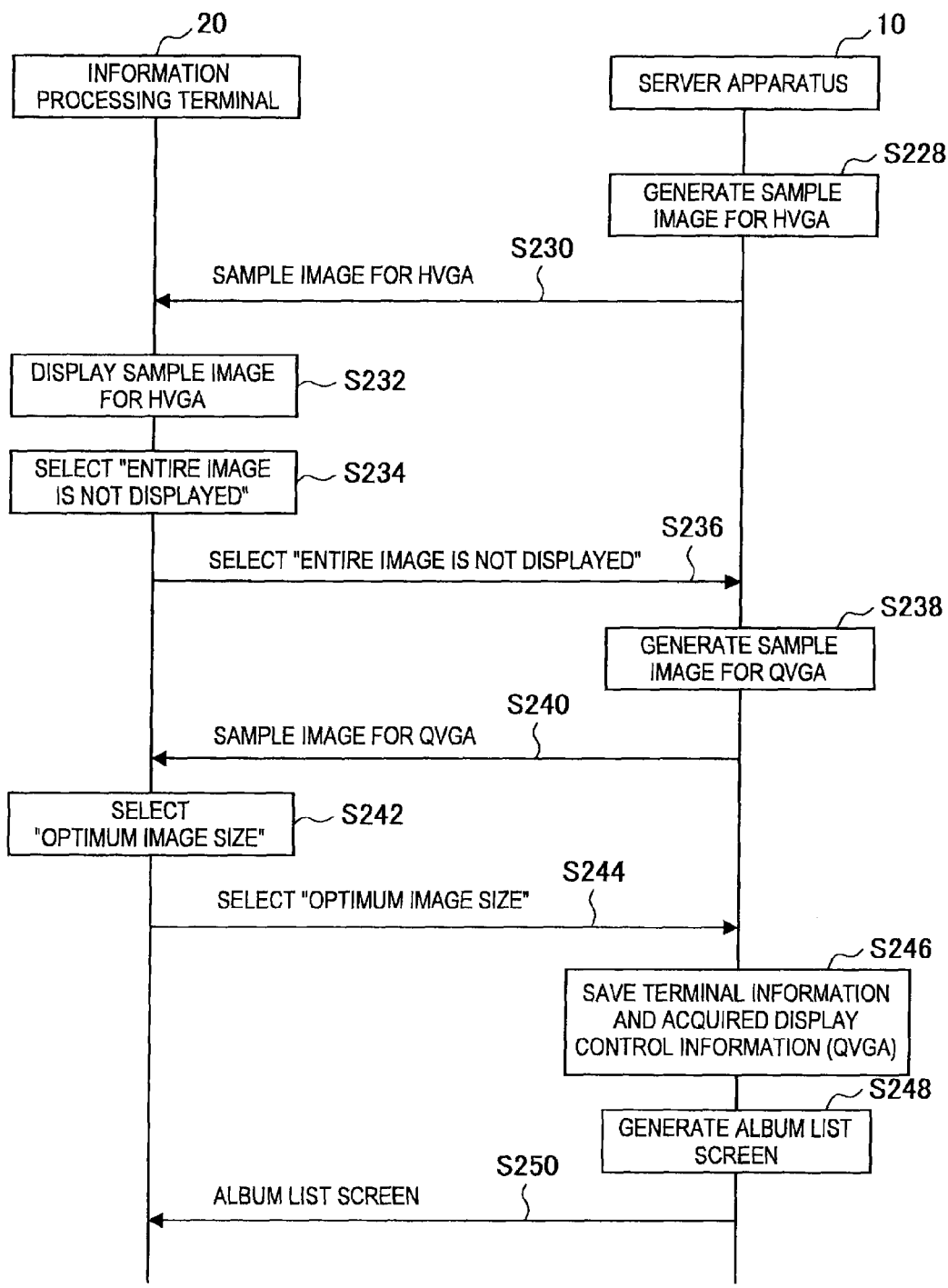
FIG. 11 is a timing chart describing the information processing method for the case in which the information processing terminal unknown in the server apparatus makes an access according to the embodiment.
Figure 12:
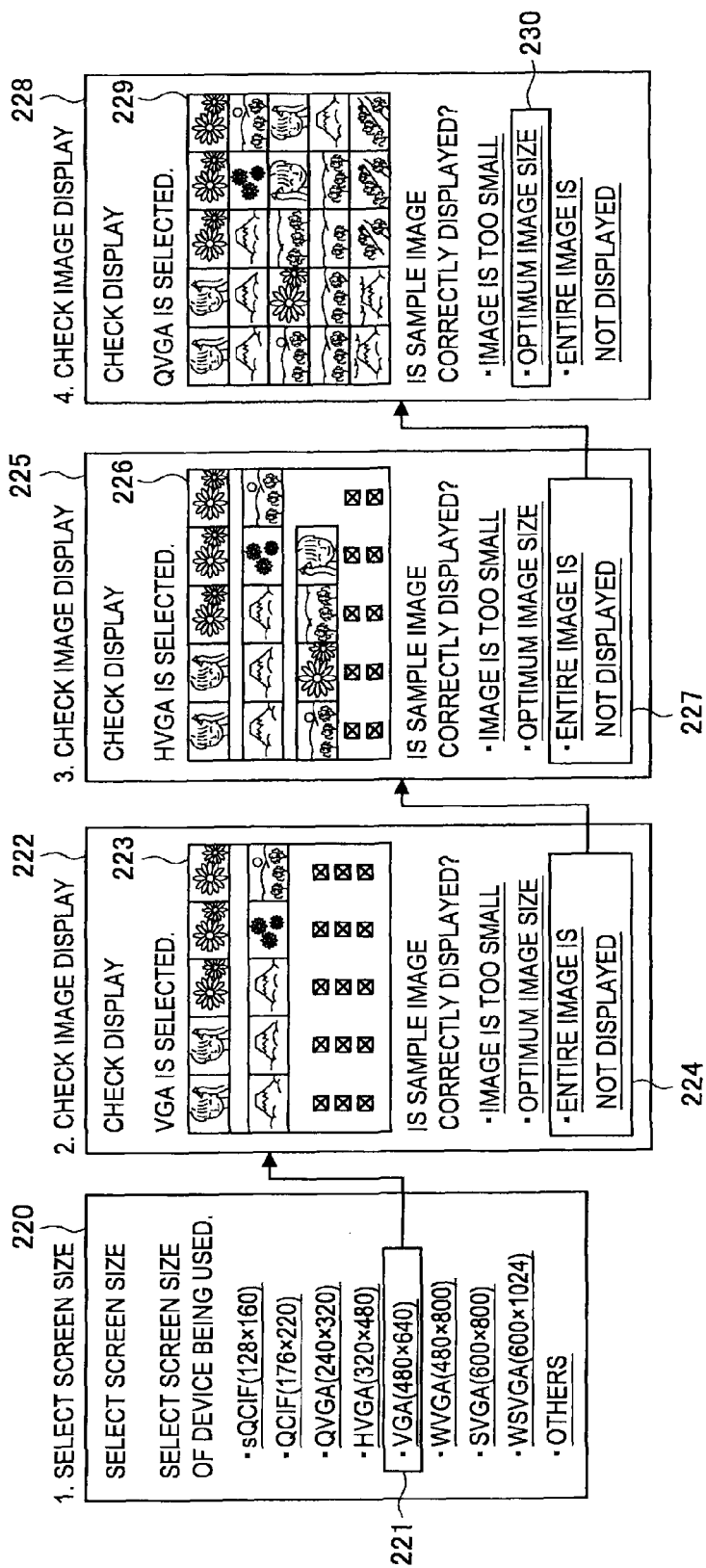
FIG. 12 is an explanatory view describing a display example of a display screen of the information processing terminal according to the embodiment.

The information processing method for the case in which the information processing terminal 20 unknown in the server apparatus 10 makes an access will now be described with reference to FIGS. 10 to 12. FIGS. 10 and 11 are timing charts describing the information processing method for the case in which the information processing terminal 20 unknown in the server apparatus 10 makes an access. In describing such information processing method, the drawing of FIG. 12 will be appropriately referenced. FIG. 12 is an explanatory view describing a display example of the display screen of the information processing terminal 20. The processes different from the information processing method for the case in which the known information processing terminal 20 makes an access will be particularly described in detail below.

As shown in FIG. 10, the information processing terminal 20 first accesses the Web site via the Internet to access the server apparatus 10 (S202). The server apparatus 10 accessed by the information processing terminal 20 in step S202 acquires terminal information of the relevant information processing terminal 20 (S204).

The image data generating unit 110 of the server apparatus 10 then searches the database of the storing unit 105 (S206). Since the information processing terminal 20 that has made the access to the server apparatus 10 in step S202 is an unknown terminal, the information of the relevant terminal is not stored in the database of the storing unit 105. The image data generating unit 110 thus generates the screen size selection screen (S208).

The screen size selection screen generated in step S208 is not given the recommending mark, and only the list of display control information (display template name) 107 stored in the storing unit 105 is displayed. The screen size represented with the screen resolution is used for the display template name. The screen size selection screen generated in step S208 is transmitted to the information processing terminal 20 that has made the access in step S202 (S210).

The displaying unit 206 of the information processing terminal 20, to which the screen size selection screen is transmitted in step S210, displays the relevant selection screen on the display screen (S212). The screen size selection screen will now be described with reference to FIG. 12. As shown in FIG. 12, only a plurality of screen sizes is displayed in a list in the screen size selection screen 220.

Returning back to FIG. 10, after the screen size selection screen is displayed on the display screen in step S212, the entering unit 202 of the information processing terminal 20 selects the screen size (VGA) in response to the user operation (S214). The information of the screen size (VGA) selected in step S214 is transmitted to the server apparatus 10 (S216). The image data generating unit 110 of the server apparatus 10 generates a sample image for the screen size (VGA) selected for the information processing terminal 20 in step S214 (S216).

The sample image generated in step S216 may exemplify a list of a plurality of thumbnails, or the like. If the information processing terminal 20 is an unknown terminal that has not made access to the server apparatus 10, the screen size suited for such terminal is not known, and hence the display image is generated using the sample image. The time for the generating process of the display image and the like can be shortened, and the user can rapidly select the optimum screen size by using the sample image. The transmitting unit 112 of the server apparatus 10 transmits the sample image for the VGA generated in step S216 to the information processing terminal 20 (S220).

In step S220, the displaying unit 206 of the information processing terminal 20, to which the sample image for the VGA is transmitted from the server apparatus 10, displays the sample image on the display screen (S222). The display screen 222 of FIG. 12 is a display example of the sample image for the VGA displayed on the display screen of the information processing terminal 20 in step S222. In the display screen 222, selectable text information 224 such as "image is too small", "optimum image size", and "entire image is not displayed" is displayed along with the sample image 223 including a plurality of thumbnails.

Returning back to FIG. 10, the entering unit 202 of the information processing terminal 20 selects "entire image is not displayed" in response to the user operation after the sample image for the VGA is displayed in the display screen in step S222 (S224). The selection information "entire image is not displayed" selected in step S224 is transmitted to the server apparatus (S226).

The image data generating unit 110 of the server apparatus 10, to which the selection information "entire image is not displayed" is transmitted in step S226, generates a sample image for a screen size (HVGA) smaller than the VGA (S228). The transmitting unit 112 of the server apparatus 10 transmits the sample image for the HVGA generated in step S228 to the information processing terminal 20 (S230).

The displaying unit 206 of the information processing terminal 20, to which the sample image for the HVGA is transmitted from the server apparatus 10 in step S230, displays the sample image on the display screen (S232). A display screen 225 of FIG. 12 is a display example of the sample image for the HVGA displayed on the display screen of the information processing terminal 20. Returning back to FIG. 11, the entering unit 202 of the information processing terminal 20 selects "entire image is not displayed" in response to the user operation after the sample image for the HVGA is displayed on the display screen in step S232 (S234). The selection information "entire image is not displayed" selected in step S234 is transmitted to the server apparatus (S236).

The image data generating unit 110 of the server apparatus 10, to which the selection information "entire image is not displayed" is transmitted in step S236, generates a sample image for a screen size (QVGA) smaller than the HVGA (S238). The transmitting unit 112 of the server apparatus 10 transmits the sample image for the QVGA generated in step S238 to the information processing terminal 20 (S240). A display screen 228 of FIG. 12 is a display example of the sample image for the QVGA displayed on the display screen of the information processing terminal 20.

Returning back to FIG. 11, the entering unit 202 of the information processing terminal 20 selects "optimum image size" in response to the user operation after the sample image for the QVGA is displayed on the display screen in step S240 (S242). The selection information "optimum image size" selected in step S242 is transmitted to the server apparatus (S244).

The server apparatus 10, to which the selection information "optimum image size" is transmitted in step S244, saves the terminal information of the information processing terminal 20 and the screen size (QVGA) in correspondence to each other in the storing unit 105 (S246). As the correspondence between the terminal information and the display control information is stored in the storing unit 105 in step S246, the screen size suited for the information processing terminal, which is the terminal unknown in the server apparatus 10, is saved. Therefore, QVGA can be recommended as an optimum screen size when the terminal of the same model as the relevant information processing terminal 20 makes an access after such correspondence is saved.

The image data generating unit 110 of the server apparatus 10 generates an album list screen (S248). The transmitting unit 112 of the server apparatus 10 transmits the album list screen generated in step S248 to the information processing terminal 20 (S250). The subsequent processes are substantially similar to the processes after step S214 in the information processing method for the case in which the known information processing terminal 20 makes an access, and thus the description will be omitted. The information processing method for the case in which the information processing terminal 20 unknown in the server apparatus 10 makes an access has been described above.

As described above, the display control information suited to the information processing terminal 20 may not be recommended since the correspondence between the terminal information and the display control information is not yet stored with respect to the information processing terminal 20 unknown in the server apparatus 10. However, as the appropriate display control information is selected from the list of display control information by the user of the information processing terminal 20, the display control information suited to the information processing terminal 20 can be stored. As a result, when an access is made by the information processing terminal 20 of the same model thereafter, the display control information suited to such information processing terminal 20 can be recommended and the image using such display control information can be displayed. Therefore, the display control information suited to the information processing terminal 20 does not need to be stored in advance, and the trouble and the cost of maintenance can be reduced every time the unknown information processing terminal 20 is increased.

According to the information processing system 1 of the present embodiment, the display control information suited to the information processing terminal 20 is entered in response to the user operation and the relevant display control information is transmitted to the server apparatus 10. The server apparatus 10 adds the correspondence between the terminal information of the information processing terminal 20 and the transmitted display control information to the storing unit 105. When a transmission request of the image data is made from the information processing terminal 20, the server apparatus 10 generates the image data to display on the display screen of the information processing terminal 20 based on the correspondence stored in the storing unit 105 and transmits the same.

The server apparatus 10 generates the image data using the display control information corresponding to the terminal information of the information processing terminal 20. The server apparatus 10 thus can add a new correspondence between the terminal information of the information processing terminal 20 and the display control information in response to the user operation of the information processing terminal 20. Therefore, the display control information such as an optimum screen size can be recommended with respect to the information processing terminal 20 that has made the access, and the image data can be generated using the display control information.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the embodiment described above, one piece of display control information is selected from the list of display control information in response to the user operation, but the present invention is not limited thereto. A detailed item (parameter item) of the display control information may be added according to the user operation. A screen size desired by the user that is not in the list of screen sizes displayed on the display screen of the information processing terminal 20 may be entered, and such screen size may be added to the storing unit 105.

The invention claimed is:

1. A server apparatus comprising:
   a storing unit configured to store a correspondence between terminal information of one or more information processing terminals connected via a network and one or more pieces of display control information associated with display screens of the information processing terminals;
   an adding unit configured to add a new correspondence between the terminal information of the information processing terminal and the display control information to the storing unit in response to a user operation of at least one information processing terminal;
   an image data generating unit configured to generate image data to be displayed on the display screen of the information processing terminal based on the correspondence stored in the storing unit when an access from at least one information processing terminal is made,
   wherein the image data generating unit is configured to generate image data including a display of a list of the display control information stored in the storing unit, wherein the display of the display control information includes resolution information, display number information, and display template name corresponding to thumbnails displayed in a list on the display screen of the information processing terminal; and
   a transmitting unit configured to transmit the image data generated by the image generating unit to the information processing terminal that has made the access.

2. The server apparatus according to claim 1, wherein the storing unit is configured to store a list of the display control information, and the adding unit is configured to add new display control information to the list of the display control information stored in the storing unit in response to the user operation of the information processing terminal.

3. The server apparatus according to claim 2,
   wherein the adding unit is configured to:
   select the display control information from the list of the display control information in response to the user operation of the information processing terminal, and
   add a correspondence between the information processing terminal and the selected display control information to the storing unit.

4. The server apparatus according to claim 1, wherein the image data generating unit is configured to generate, on the display screen of the information processing terminal that has made the access, the image data using the display control information corresponding to the terminal information of the information processing terminal of the correspondences stored in the storing unit.

5. The server apparatus according to claim 1, wherein the image data generating unit is configured to generate image data in which the display control information corresponding to the terminal information of the information processing terminal of the display control information displayed in a list on the display screen is displayed distinguished from other display control information when an access is made from the information processing terminal.

6. The server apparatus according to claim 1, wherein the image data generating unit is configured to generate image data for displaying a predetermined image using a display format based on the display control information corresponding to the terminal information of the information processing terminal on the display screen of the information processing terminal that has made the access.

7. The server apparatus according to claim 1, further comprising:
   a counting unit configured to count the number of times specific display control information is selected from the list of the display control information in response to the user operation of the information processing terminal,
   wherein the image data generating unit is configured to generate image data preferentially using display control information corresponding to the terminal information of the information processing terminal for which the number of times counted by the counting unit is large on the display screen of the information processing terminal that has made the access.

8. The server apparatus according to claim 1,
   wherein the server apparatus is connected to a plurality of other server apparatuses via the network, and
   the display control information is mutually transmitted and received for sharing among the connected plurality of other server apparatuses.

9. The server apparatus according to claim 1, wherein the image data generating unit is configured to generate the image data to include a recommending mark so that the display of the list of the display control information includes a recommending mark corresponding to one of the display control information in the list of the display control information.

10. The server apparatus according to claim 1, wherein the recommending mark is displayed in a manner to distinguish the corresponding one of the display control information from other display control information in the list of the display control information, wherein the recommending mark is used to recommend the corresponding display control information for displaying images on the information processing terminal that has made the access.

11. The server apparatus according to claim 1, wherein the display template name includes a name of a standard display resolution of the thumbnails displayed in the list.

12. An information processing method comprising:
adding a new correspondence between terminal information of an information processing terminal and display control information to a storing unit, the storing unit stores a correspondence between the terminal information of the information processing terminal and one or more pieces of display control information associated with display screens of the information processing terminals in response to a user operation of one or more information processing terminals connected via a network;
generating image data to be displayed on the display screen of the information processing terminal based on the correspondence stored in the storing unit when an access from at least one information processing terminal is made, wherein generating further comprises generating image data including a display of a list of the display control information, including the display of resolution information, display number information, and display template name corresponding to thumbnails displayed in a list on the display screen of the information processing terminal; and
transmitting the generated image data to the information processing terminal that has made the access.

13. An information processing system, comprising:
a server apparatus including:
a storing unit configured to store a correspondence between terminal information of an information processing terminal connected via a network and one or more pieces of display control information associated with display screens of the information processing terminals;
an adding unit configured to add a new correspondence between the terminal information of the information processing terminal and the display control information to the storing unit in response to a user operation of at least one information processing terminal;
an image data generating unit configured to generate image data to be displayed on the display screen of the information processing terminal based on the correspondence stored in the storing unit when an access from the information processing terminal is made,
wherein the image data generating unit is configured to generate image data including a display of a list of the display control information, including the display of resolution information, display number information, and display template name corresponding to thumbnails displayed in a list on the display screen of the information processing terminal; and
a transmitting unit configured to transmit the image data generated by the image generating unit to the information processing terminal, and
the information processing terminal including:
an entering unit configured to enter display control information suited to the information processing terminal in response to the user operation;
a transmitting unit configured to transmit the display control information entered by the entering unit to the server apparatus; and
a displaying unit configured to display the image data transmitted by the server apparatus on the display screen.

* * * * *